United States Patent
Li et al.

(10) Patent No.: US 11,140,451 B2
(45) Date of Patent: Oct. 5, 2021

(54) REPRESENTATION OF CONTENT BASED ON CONTENT-LEVEL FEATURES

(71) Applicant: HULU, LLC, Santa Monica, CA (US)

(72) Inventors: Fanding Li, Beijing (CN); Xiaohui Xie, Beijing (CN); Jing Ruan, Beijing (CN); Chao Yi, Beijing (CN)

(73) Assignee: HULU, LLC, Santa Monica, CA (US)

( * ) Notice: Subject to any disclaimer, the term of this patent is extended or adjusted under 35 U.S.C. 154(b) by 119 days.

(21) Appl. No.: 16/535,008

(22) Filed: Aug. 7, 2019

(65) Prior Publication Data

US 2021/0044870 A1    Feb. 11, 2021

(51) Int. Cl.
    *H04N 21/466*    (2011.01)
(52) U.S. Cl.
    CPC ............... *H04N 21/4668* (2013.01)
(58) Field of Classification Search
    CPC ......... H04N 21/4668; H04N 21/47202; H04N 21/266; H04N 21/252; H04N 21/4826
    See application file for complete search history.

(56) References Cited

U.S. PATENT DOCUMENTS

| | | | |
|---|---|---|---|
| 2016/0306882 A1* | 10/2016 | Namboodiri | G06F 17/30784 |
| 2017/0161618 A1* | 6/2017 | Swaminathan | G06F 17/30345 |
| 2018/0144052 A1* | 5/2018 | Sayyadi-Harikandehei | H04N 21/231 |

OTHER PUBLICATIONS

Perozzi et al.: "DeepWalk: Online Learning of Social Representations"; KDD'14; Aug. 24-27, 2014; New York, NY; 10 pages.
Devlin et al.: "BERT: Pre-training of Deep Bidirectional Transformers for Language Understanding"; arXiv:1810.04805v2 [cs.CL] May 24, 2019; 16 pages.
Devlin et al.: "Open Sourcing BERT: State-of-the-Art Pre-training for Natural Language Processing"; Google AI Blog; Nov. 2, 2018; 5 pages.
Grover et al.: "node2vec: Scalable Feature Learning for Networks"; KDD16, Aug. 13-17, 2016, San Francisco, CA; 10 pages.

* cited by examiner

*Primary Examiner* — Anthony Bantamoi
(74) *Attorney, Agent, or Firm* — Fountainhead Law Group P.C.

(57) ABSTRACT

In some embodiments, a method maps attributes of metadata for a plurality of content instances to metadata nodes. The metadata nodes are connected to type nodes that define a type of metadata for each metadata node and a respective content node for a respective content instance. The method generates a plurality of sample paths using the content nodes, the metadata nodes, and the type nodes from the mapping of attributes of the metadata. A similarity of content nodes is analyzed using the plurality of sample paths. Then, the method generates a representation of each of the plurality of content instances using the similarity of the content nodes. The representation represents the similarity between content instances in the plurality of content instances.

20 Claims, 9 Drawing Sheets

REPRESENTATION OF CONTENT BASED ON CONTENT-LEVEL FEATURES

BACKGROUND

In a video delivery system, recommending videos to a user is very important to keep the user engaged with the video delivery system. For example, when a user finishes watching a video, if a relevant recommendation to the user is provided, the user may continue to use the video delivery system to watch the recommended video instead of logging off the system. Further, when the user is searching for a video to watch, if relevant recommendations are provided to the user, there is a higher chance that the user may select one of the recommended videos to watch.

Different approaches may be used to generate the recommendations. One method of generating recommendations is based on a type of collaborative filtering that determines that if a first user watched a video #1 and also a video #2, then the two videos may be similar to each other. Then, the system determines that if a second user watched video #1, then that user may also want to watch video #2. However, if video #1 and video #2 are very popular, then the collaborative filtering results may be skewed. For example, if many users watch both video #1 and video #2, the similarity of video #1 to video #2 may not actually be strong because the popularity of the videos means that they would often be watched together even without the videos being similar. That is, if both video #1 and video #2 are very popular and most people have watched both videos, video #1 and video #2 may not be similar other than that the videos are both popular. The skewing of the results may make the recommendations not as relevant to users.

DETAILED DESCRIPTION

Figure 1:
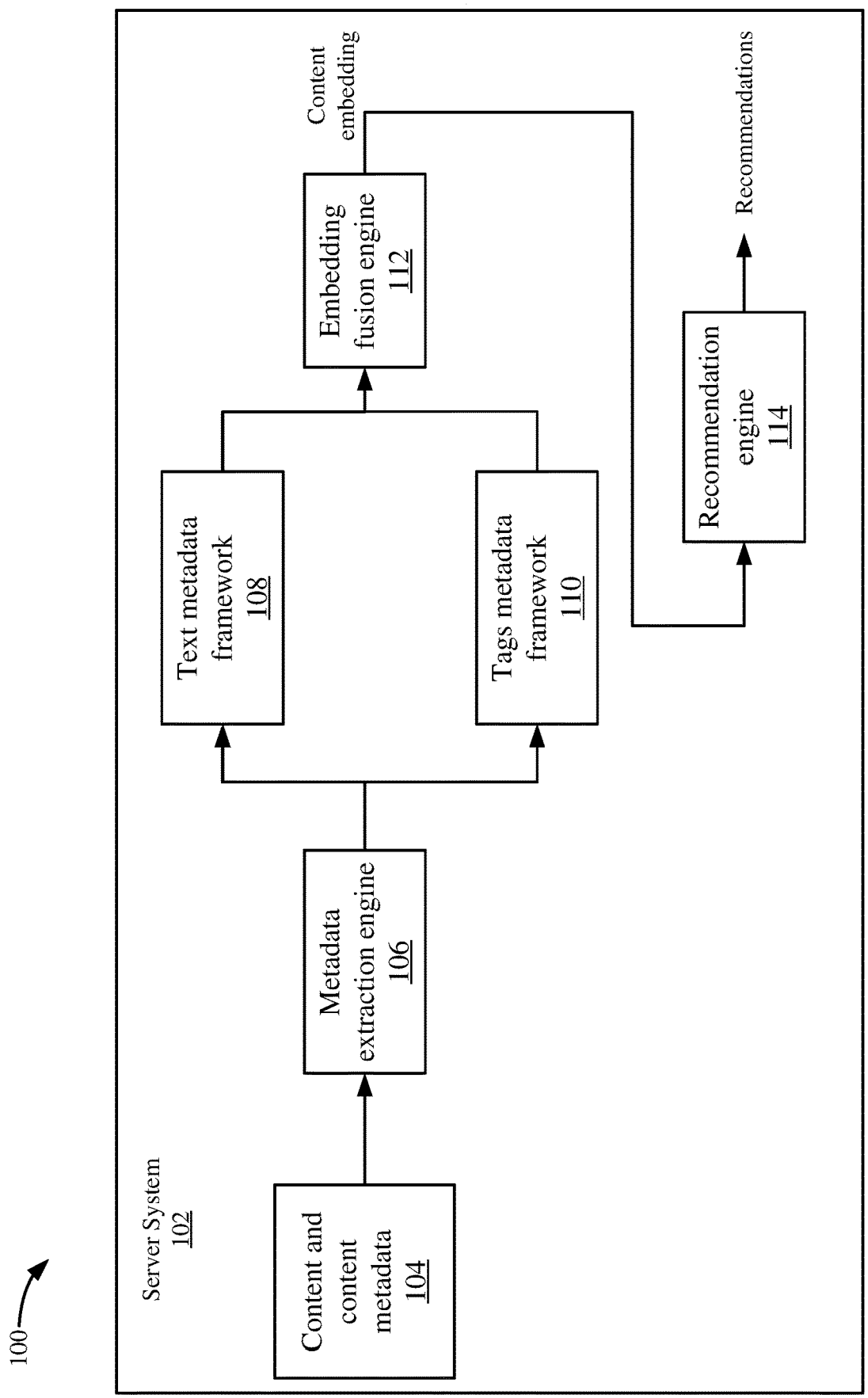
FIG. 1 depicts a simplified system for generating recommendations according to some embodiments.

Described herein are techniques for a recommendation system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments generate recommendations for content instances based on content-level features. The content instances may be associated with an asset, such as a movie, television show, etc. For example, a content instance may include a video that is offered for playback on the video delivery system. Also, each content instance may include content-level features that describe the content instance. For example, content-level features may be based on metadata for the content, such as videos that are being offered by a video delivery system. In some embodiments, the metadata is received and processed to determine a representation for the content. In some embodiments, the representation may be a content embedding, which may be a representation, such as a vector, that represents the content in a space (e.g., a two dimensional space).

In some embodiments, the metadata may be separated into text metadata and tags metadata. The text metadata may be based on a description of the content. The tags metadata may be based on attributes of the content. For example, text metadata may be a description describing the plot of the content that includes one or more natural language sentences. The tags metadata may be attributes describing the content, such as the director, movie name, rating, etc. The tags metadata may not include multiple sentences. Also, the tags metadata may be any metadata that is not considered text metadata. Although text metadata and tags metadata are described as being processed separately, both text and tags metadata may be processed together.

A text metadata framework and a tags metadata framework may each generate a representation for the content instance, such as a text metadata embedding and a tags metadata embedding. In some embodiments, the text metadata embedding and the tags metadata embedding may be combined to create a combined representation, such as a content embedding for the content. The content embedding may be a vector that describes the content instance. When all the content instances being offered by the video delivery system have been processed, each content instance may have a content embedding.

The video delivery system may use the content embeddings to generate recommendations. For example, when attempting to determine similar videos to a video that a user just watched on the video delivery system, the video delivery system searches for other videos that have a similar content embedding to the video that the user just watched. The video delivery system can then provide some of those videos as recommendations. Because the content embedding is based on content-level features, the recommendations may be more relevant at the content level compared to using a collaborative filtering approach that uses the watch behavior for the user. For example, the recommendations may have similar content to the video that the user just watched instead of just being two videos a user may have watched together.

System Overview

FIG. 1 depicts a simplified system 100 for generating recommendations according to some embodiments. A server system 102 may include content stored in storage 104, a metadata extraction engine 106, a text metadata framework 108, a tags metadata framework 110, an embedding fusion engine 112, and a recommendation engine 114.

Storage 104 may include different content instances and content metadata. For example, content instances may be videos that are being offered to users using the video delivery system. Videos may include different types of content, such as shows, movies, shorts, etc. However, the content may not be limited to videos, but may be any type of content being offered by the video delivery system, such as audio content.

A metadata extraction engine 106 receives content instances and can extract information about content instances. The metadata may be content-level features that describe the content. The metadata for the content may be received from different sources, such as a content provider that may provide metadata with the content itself. Other content may be also received from third party companies. In some embodiments, the metadata may include the following attributes of:

Premiere date: a date time marking the premiere of the show.
Content type: a label denoting whether the content is a TV series, movie, or live show.
Genres: a list of labels representing the categories, such as Drama, Horror, Romance, Crime, etc.
Actors: a name list of people in the video.
Directors: a name list of people who directed the video.
Awards: a list of awards with region, title, and time information.
Ratings: a label indicating the suitability of content to its audience, such as PG, PG-13, R, etc.
Keywords: a tag list demonstrating different aspects of descriptive information, such as love, nature, etc.
Description: several natural language sentences introducing the synopsis of the story.

The metadata may be in different forms and may be separated into a text format and a tags format. The text format may include a textual description of the content in natural language sentences and the tags format may capture other types of metadata formats. Within the tags metadata format, the formats of the metadata may also be different. For example, the tags format may include attributes that identify information, such as dates, names, keywords, etc. In some embodiments, any metadata that is not in the text metadata may be placed in the tags metadata.

Text metadata framework 108 may process the text metadata, and tags metadata framework 110 may process the tags metadata. The text metadata may be processed differently to determine a representation of the text metadata from the tags metadata format. Accordingly, different frameworks may be used to produce representations from the text metadata and the tags metadata. However, in other embodiments, the same framework may be used to process both text metadata and tags metadata.

Embedding fusion engine 112 receives a first output from text metadata framework 108 and a second output from tags metadata framework 110. In some embodiments, text metadata framework 108 outputs a first representation that represents the text of the content and tags metadata framework 110 outputs a second representation that represents the tags for the content. Embedding fusion engine 112 then combines the first output and the second output to generate a final representation for the content. In some embodiments, the final representation may be a content embedding, which may be a vector that represents the content in a space.

Server system 102 may generate content embeddings for all content instances in storage 104. Then, recommendation engine 114 may generate recommendations for users using the content embeddings. For example, recommendation engine 114 may receive user behavior, such as what content a user is watching or has watched, and then generate recommendations for that user. In some embodiments, when a user watches a first video, recommendation engine 114 may select other videos that may have similar content embeddings. This provides recommendations of videos that are similar on the content level to the video the user watched.

The following will describe the processing for text metadata and tags metadata, and then the generation of recommendations in more detail.

Text Metadata Framework

Figure 2:
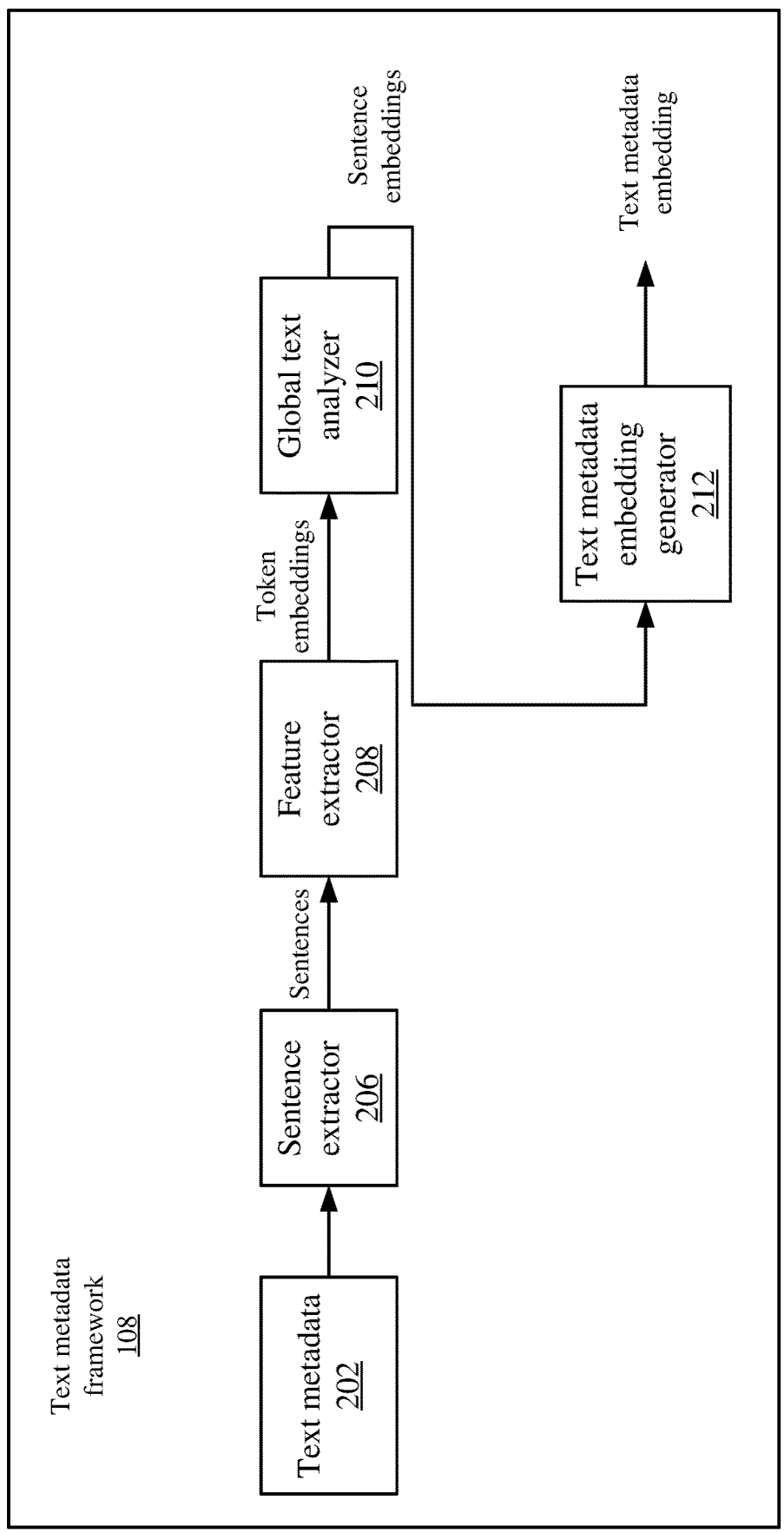
FIG. 2 depicts a more detailed example of a text metadata framework according to some embodiments.

FIG. 2 depicts a more detailed example of text metadata framework 108 according to some embodiments. A sentence extractor 206 receives text metadata 202. As discussed above, the text metadata may be a description of the content, which may describe the plot of the content or other aspects of the content. The text may include natural language sentences that provide semantic information that may be captured by analyzing the sentences of the description. Sentence extractor 206 may extract the sentences from the description of the content. In some embodiments, sentence extractor 206 may analyze the text and determine where sentences start and end in the metadata. Then, sentence extractor 206 extracts the separate sentences in a series of sentences $S_1, S_2, \ldots S_n$. Each sentence may include one or more words.

A feature extractor 208 receives the sentences and can extract features from the sentences. Feature extractor 208 may capture the relationship between sentences by attempting to predict the next sentence from a current sentence. The prediction may model the coherence inside the natural language description of the content. The coherence of a story in the description may be important to determine the meaning of the sentences. In some embodiments, a neural network is used to extract the features of the sentences. For example, transformer seq2seq blocks are a self-attention mechanism driven model based on a plethora of words. The blocks can extract features based on the known words. For example, given the text paragraph, feature extractor 208 extracts a last hidden layer of the neural network to extract the features of the text metadata.

Then, a global text analyzer 210 may vectorize the sentences by taking the tokens (e.g., the important words) in the sentence and generating sentence embeddings. For example, feature extractor 208 may obtain sentence embeddings just by averaging all the final hidden layers of the neural network that include all the tokens in the sentence. This may remove the paragraph-level information and focus on local sentence level information. Global text analyzer 210 may add global information to the sentence embeddings. For example, global information may be inverse document frequency. For example, if a word is popular among all description metadata for different content, then global text analyzer 210 may weight this word lower in the local sentence slightly, because it may not be as important to describe the sentence. Also, stop words, conjunctions, and other popular words are weighted lower (e.g., 'the', 'a', 'as', 'for', etc.), since these words do not help determine the semantic meaning within a sentence. Then, global text analyzer 210 may increase the weight for those words that appear relatively less in other descriptions, as these words may give a higher semantic meaning to the sentence. The output of global text analyzer 210 is the text metadata embedding.

To better formulate the whole procedure of text metadata embedding framework, the sentences of the content description are denoted as $S = \{s_1, s_2, S_N\}$, and each sentence $s_i$ with $m_i$ tokens is formed by a token sequence ($w_{i1}$, $w_{i2}$, $w_{im_N}$). First, for each token $w_{i,j}$, text metadata framework 108 calculates its frequency $p_{w_{ij}}$ in the entire corpus, and receives the token embedding $v_{w_{ij}}$ (e.g., a 768-dimensional vector in float value) from feature extractor 208. In some embodiments, text metadata framework 108 may generate each sentence embedding using:

$$v_{s_i} = \frac{1}{m_i} \sum_{j=1}^{m_i} \frac{a}{a + p_{w_{ij}}} v_{w_{ij}},$$

where a is a hyper-parameter to control the smooth rate and may be set at $10^{-4}$. The embedding of description text is given by averaging all of the sentence embeddings it contains:

$$v_S = \frac{1}{N} \sum_{i=1}^{N} v_{s_i}.$$

The sentence embedding summarizes the semantic and importance of words that are found in the sentences in a representation. A text metadata embedding generator 212 may then generate the text metadata embedding based on the sentence embeddings. In some embodiments, text metadata embedding generator 212 may take the average of the sentence embeddings and generate the text metadata embedding for the content instance. Though an average is discussed, other methods of generating the text metadata embedding may be appreciated, such as a weighted average of the sentence embeddings.

Tags Metadata Embedding

The tags metadata may be links between the content instance and the attributes of the content instance. A graph may describe the tags metadata for multiple content instances, such as multiple videos. Each node in the graph may represent a content instance or an attribute for a content instance. After building the graph, tags metadata framework 110 generates a tags metadata embedding for each content instance. As discussed above, the tags metadata may be metadata other than the description of the content, but this metadata may include heterogeneous data types. The heterogeneous types cause the generation of the tags metadata embedding to be more difficult as models that only work with nodes of the same type are not able to generate the tags metadata embedding for the content instances. This may neglect inner differences between different types of metadata, such as a time node that is similar to a genre node in the embedding space because they always link the same entities, whereas two time nodes might not be similar resulting from a lack of co-occurrences since normally the entity has only one unique premiere date. Tags metadata framework 110 overcomes this problem by including extra nodes for the metadata that connect to the metadata nodes based on a type of the metadata. For example, the extra node may be referred to as a type node for a kind of metadata in the graph. The use of the type nodes may organize the graph to increase the co-occurrence probability of nodes within the same type.

Figure 3:
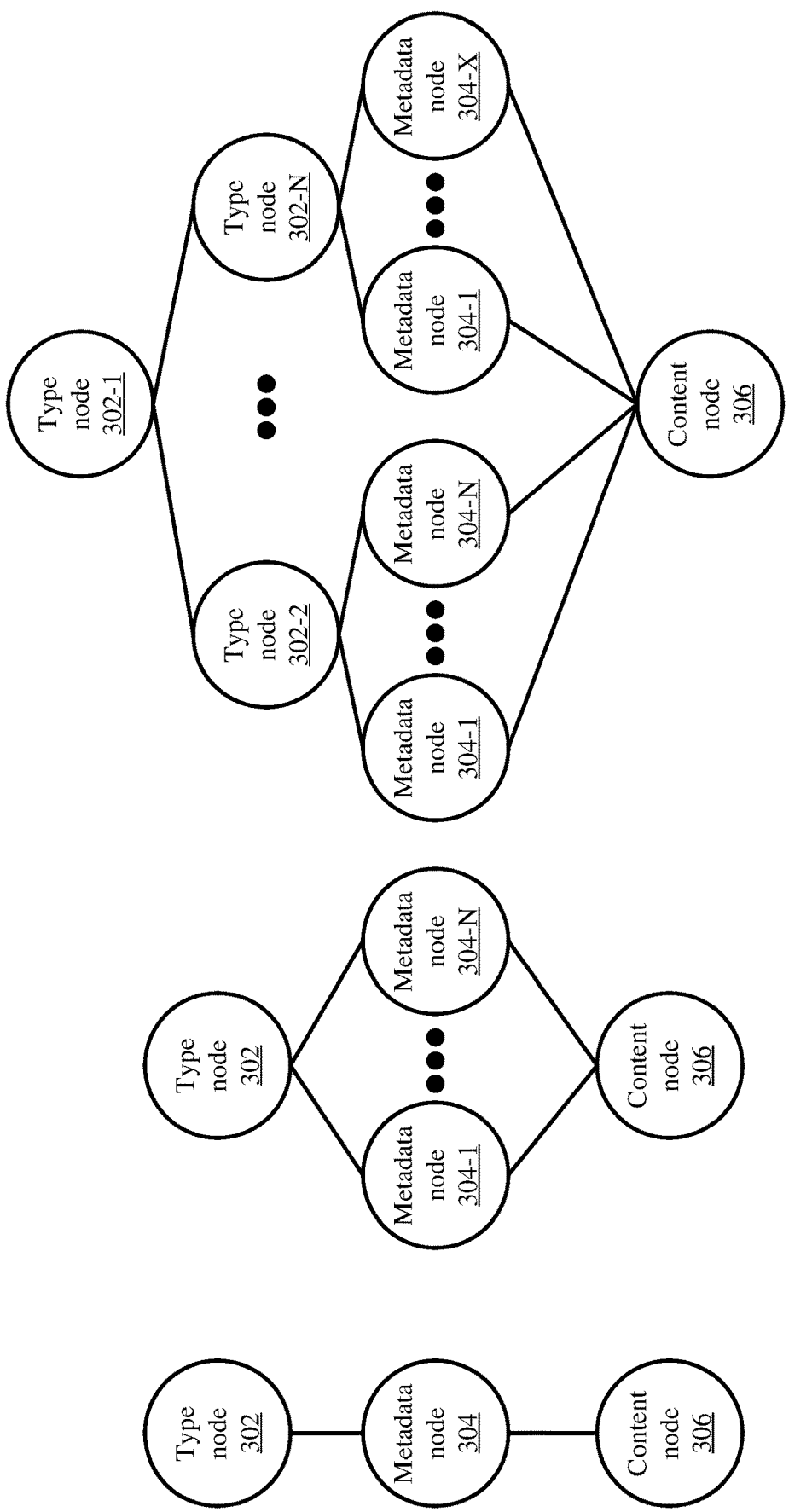
FIG. 3A depicts a first kind of type node according to some embodiments.
FIG. 3B depicts a second kind of type node according to some embodiments.
FIG. 3C depicts a third kind of type node according to some embodiments.

FIGS. 3A to 3C illustrate different kinds of type nodes according to some embodiments. Although these type nodes are described, other type nodes may be appreciated. FIG. 3A depicts a first kind of type node 302 according to some embodiments. Type node 302 may be associated with a single metadata node 304. Metadata node 304 may then be associated with a content node 306. Type node 302 may be associated with different types of metadata. For example, the type node may be considered a content type attribute associated with the type of content being described in metadata node 304. Examples of metadata node 304 may be "Movie" or "Television Show". Then, content node 306 may be the name of the movie or television show.

FIG. 3B depicts a second kind of type node 302 according to some embodiments. Type node 302 may be associated with multiple metadata nodes of the same type according to some embodiments. For example, metadata node 304-1 to metadata node 304-N may be associated with type node 302. Then, metadata node 304-1 to metadata node 304-N may be associated with content node 306. One example of type node 302 may be a "Genre" type. Then, metadata nodes 304-1 to 304-N may be different types of genres, such as "Horror", "Drama", "Comedy", etc. Another kind of type node 302 is a ratings node. Metadata nodes 304-1 to 304-N may be "Ratings", such as different rating values of one-star, two-star, three-star, etc. for a movie. Another kind of type node 302 may be an awards-type node. Metadata nodes 304-1 to 304-N may be "Awards" for content node 306, such as a movie may have received multiple different awards, such as an Oscar, Screen Actors Guild Award, etc.

FIG. 3C depicts a third kind of type node 302 according to some embodiments. Type nodes 302-1, 302-2, and 302-N may be different type nodes that are connected together in the graph. Type node 302-1 may be at the root of the graph and type nodes 302-2 and 302-N may be connected to type node 302-1 in a tree structure. Although a tree structure is described, other structures may be used. Further, a different number of layers may also be appreciated that are greater than two layers. For example, more type nodes 302 may be connected to type node 302-2 or type node 302-N.

Metadata nodes 304-1 to 304-N are associated with type node 302-2 and metadata nodes 304-1 to 304-X are associated with type node 302-N. All metadata nodes 304 are associated with content node 306. In some embodiments, type node 302-1 may be a "People" node; type node 302-2 may be an "Actors" node; and type node 302-N may be a "Directors" node. The actors and directors may be people. Then, metadata nodes 304-1 to 304-N may list actors for the content instance. Then, metadata nodes 304-1 to 304-X may list the directors for the content instance.

Another example of the third kind of type node is where type node 302-1 is a keyword and type node 302-2 is a subclass for that keyword. Metadata nodes 302-1 to 302-N are for different keywords associated with the subclass of type node 302-2, and metadata nodes 304-1 to 304-X are keywords associated with the subclass of type node 302-N. These keywords may describe the content of content node 306, such as a first keyword subclass is "Character" and a second keyword subclass is "Mood". The Character subclass may be linked to "Physicist" and "Pilot" as characters and the Mood subclass may be linked to "Brooding" and "Emotional", which may be moods of the characters.

For the Content type, Genres type, and Ratings type, metadata nodes 304 are kept as original and links between each metadata node to its corresponding type node are added. For the Actors type node and Directors type node, a similar relationship is used, except these two type nodes link to a new type node, such as a type node of people for the Actors type node and Directors type node. For the Awards type node, the metadata nodes may omit the time information and treat the combination of region and title award as the metadata, which later links to the type node of the award type. For the Premiere Date type node, the date may be divided into different granularities of date, year, decade, etc. For the Keywords type node, each keyword may be mapped to a defined subclass, such as the keyword "Love" is mapped to "Theme"; the keyword "Nature" is mapped to "Subject", and these class nodes are linked to the type node of keywords.

Figure 4:
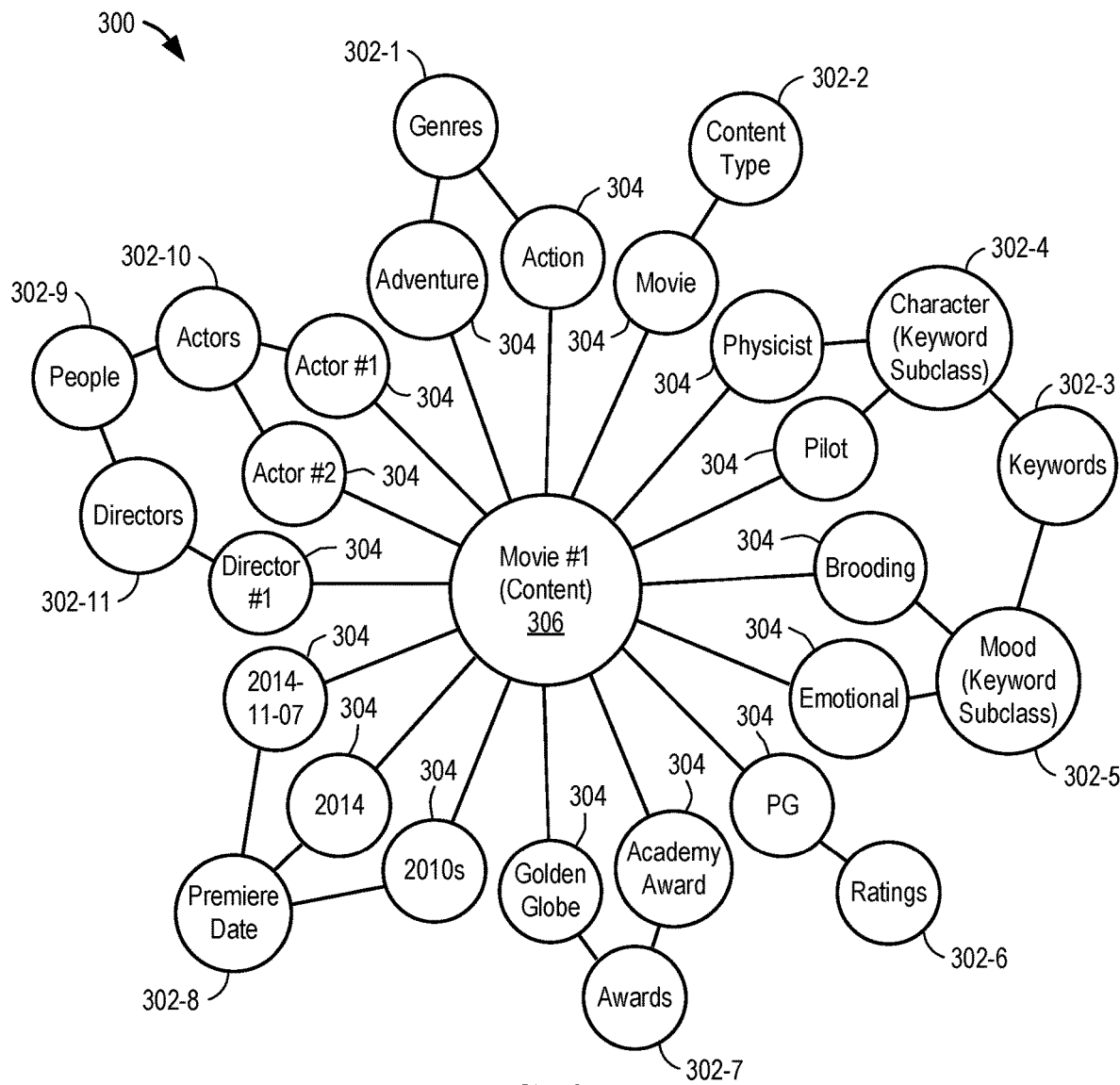
FIG. 4 depicts a subgraph for content according to some embodiments.

The metadata may be linked to the type nodes for content to form a subgraph. Each subgraph for different content may then be connected together. FIG. 4 depicts a subgraph for content according to some embodiments. A movie #1 may be associated with a content node 306. This is a movie for which metadata has been received and the tags metadata is summarized in subgraph 300. Different type nodes 302-1 to 302-11 are included in subgraph 300. For example, type node 302-1 is for the Genres type; type node 302-2 is for the Content type; type nodes 302-3, 302-4, and 302-5 are Keywords type nodes; type node 302-6 is a Ratings type node; type node 302-7 is an Awards type node; type node 302-8 is a Premiere Date type node; and type nodes 302-9, 302-10, and 302-11 are People type nodes.

Genre type node 302-1 may be associated with "Adventure" and "Action" metadata tags. That is, movie #1 may have content that is associated with adventure and action. Content type 302-2 may be associated with a "Movie" tag. That is, movie #1 is a movie.

Keywords type nodes 302-3, 302-4, and 302-5 are associated with a "Character" keyword subclass and a "Mood" keyword subclass at 302-5. The Character keyword subclass 302-4 is associated with the "Physicist" and "Pilot" keywords while the Mood keyword subclass 302-5 is associated with the "Brooding" and "Emotional" subclasses. That is, movie #1 may have characters who are associated with a physicist and pilot and the mood of these characters are brooding and emotional. Ratings type nodes 302-6 are associated with a "PG" rating. That is, movie #1 may have been assigned a PG rating.

The awards type node 302-7 is associated with the tags metadata of "Academy Award" and "Golden Globe". That is, movie #1 may have won an Academy Award and a Golden Globe Award.

Premiere Date type node 302-8 is associated with the dates "2014-11-07", "2014", and "2010s". That is, movie #1 may have premiered on Nov. 7, 2014, in the year 2014, and is associated with the decade 2010.

People type node 302-9 is associated with the "Actors" type node 302-10 and the "Directors" type node 302-11. Actors type node 302-10 is associated with an actor #1 and an actor #2 tags metadata. Directors type node 302-11 is associated with a director #1 tags metadata. That is, director #1 may have directed movie #1 and actors #1 and #2 acted in movie #1.

Figure 5:
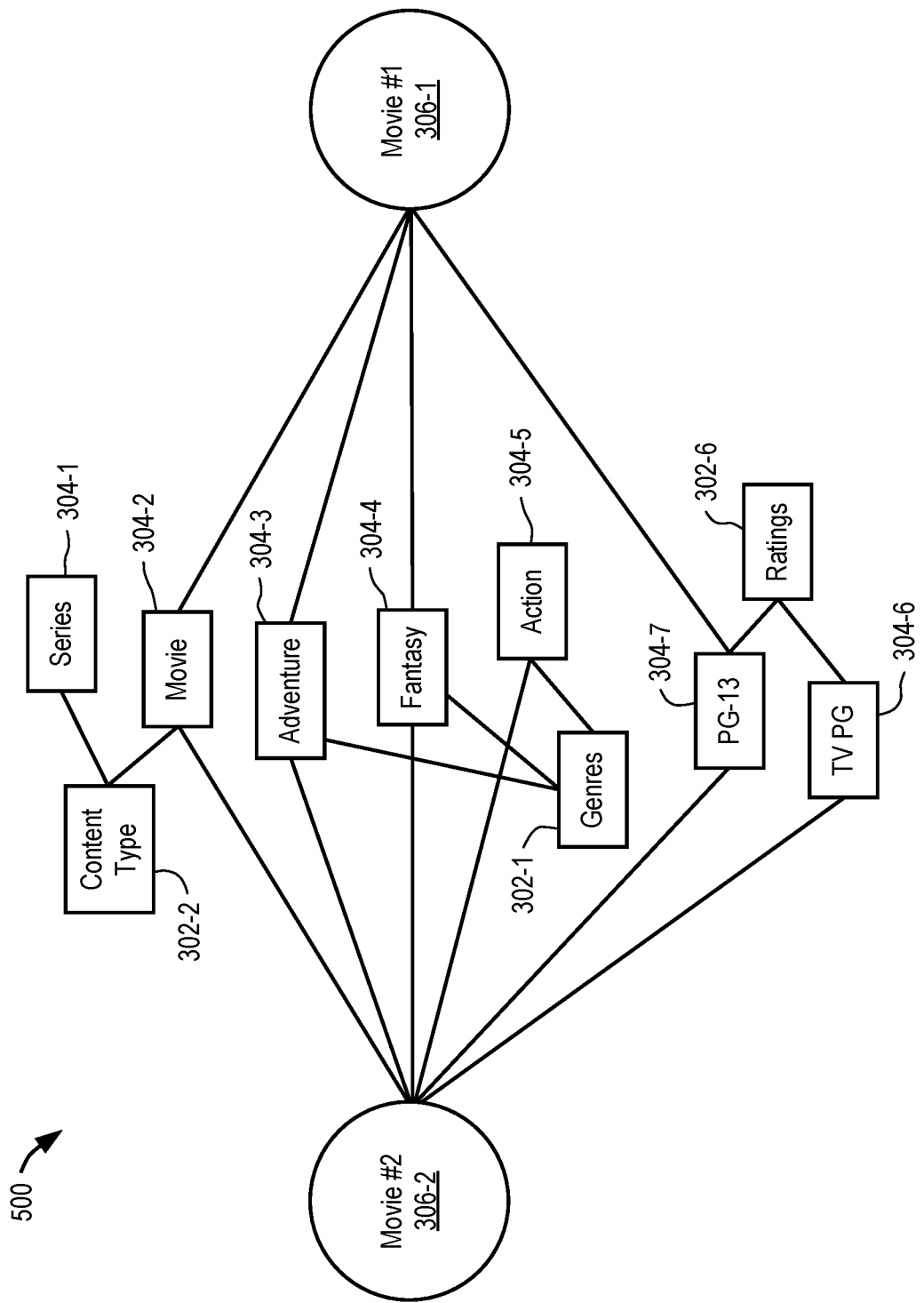
FIG. 5 depicts an example of a portion of a content graph according to some embodiments.

Tags metadata framework 110 may combine subgraphs for multiple content instances into a content graph. FIG. 5 depicts an example of a portion of a content graph according to some embodiments. Content graph 500 includes nodes for a first movie #1 at 306-1 and nodes for a second movie #2 at 306-2. It is noted that only a portion of the metadata nodes 304 and type nodes 302 are shown, but others may be appreciated. For example, each movie may have multiple other type nodes 302 and metadata nodes 304. Further, the type nodes 302 may also link to other nodes for other movies and metadata nodes 304 may also link to other nodes for other movies.

A "Content" type node 302-2 is associated with a metadata node 304-1 that has an attribute value of "Series" and a node 304-2 that has an attribute value of "Movie". Metadata node 304-2 is linked to movie #1 and movie #2 while metadata node 304-1 is not linked to either movie because the node is for a television series. A metadata node 304-3 has an attribute value of "Adventure", a metadata node 304-4 has an attribute value of "Fantasy", and a metadata node 304-5 has an attribute value of "Action", and these nodes are linked to a type node 302-1 that has an attribute value of "Genres". Movie #2 is linked to metadata node 304-5, metadata node 304-4, and metadata node 304-3. Also, movie #1 is linked to metadata node 304-3 and metadata node 304-4. Accordingly, the metadata indicates that Movie #2 may be associated with adventure, fantasy, and action genres, while movie #1 may be associated with adventure and fantasy genres.

A type node 302-6 that has an attribute value of "Ratings" is associated with metadata node 304-6, which has an attribute value of "TV PG", and metadata node 304-7, which has an attribute value of "PG-13". Movie #1 is linked to metadata node 304-7 and movie #2 is linked to metadata node 304-6 and metadata node 304-7. In this case, the metadata indicates that movie #2 may be rated TV PG and movie #1 may be rated PG-13, which also includes TV PG. The type nodes link the metadata nodes together. In one case, metadata node 304-7 for PG-13 and metadata node 304-6 for TV PG both link to Movie #2, but metadata nodes 304-2, 304-3, and 304-5 for Movie, Adventure, Action, are also linked with Movie #2. From the graph level, all these nodes have nearly the same probability to be in a same sample path. A sample path is used to determine the similarity of content nodes by generating paths through different nodes, the process of which will be described in more detail below. However, after using the type node of Ratings, metadata nodes 304-7 and 304-6 for PG-13 and TV PG have a higher chance to be in the same sample path, and therefore get more similar embeddings than the metadata node 304-7 for PG-13 to metadata node 304-3 for Adventure or other metadata nodes in other types. For example, the sample path may go from metadata node 304-7 PG-13 to metadata node 302-6 for Ratings. Once the type node 302-6 for Ratings is selected, other nodes connected to the type node are metadata nodes for Ratings. Then, the next node in the path may be a metadata node for Ratings (or if there are multiple levels of type nodes, another type node related to the type node for Ratings). According, in this example, the next selected node from type node 302-6 for Ratings is metadata node 304-6 for TV-PG. The Ratings node makes metadata nodes 304-7 and 304-6 for PG-13 and TV PG within a node of each other and more likely that metadata nodes for Ratings are included in the same path compared to other types of nodes.

Figure 6:
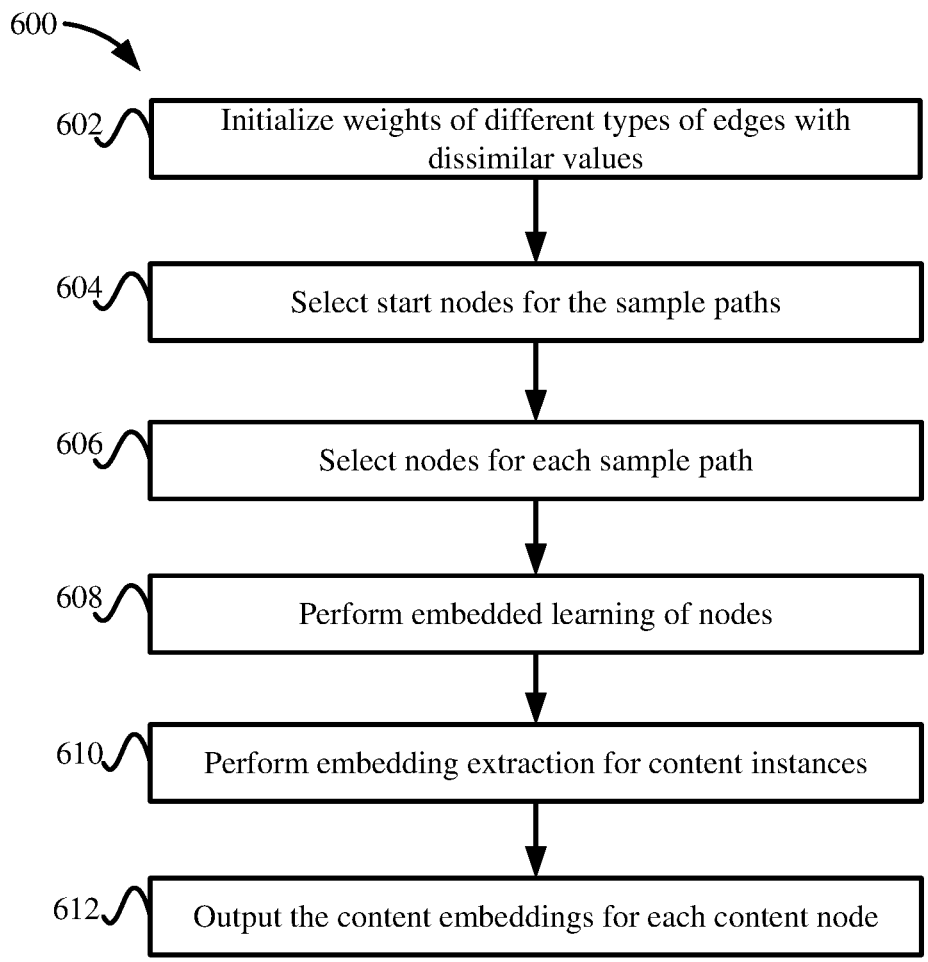
FIG. 6 depicts a simplified flowchart of a method for generating the tags metadata embeddings for content nodes according to some embodiments.

After building an entire graph with all the content instances and their metadata nodes, tags metadata framework 110 may generate the tags metadata embeddings for each content node. FIG. 6 depicts a simplified flowchart 600 of a method for generating the tags metadata embeddings for content nodes according to some embodiments. At 602, tags metadata framework 110 initializes weights of different types of edges with dissimilar values. The weights may be generated to control the impact of different metadata on the tags metadata embeddings. In some embodiments, tags metadata framework 110 may generate the weights based on the type node or the metadata node. For example, the weights of edges between the content and each of the metadata nodes, such as a metadata date, year, decade, content type, genre, actor, director, award, keyword, are set at different values, such as 0.6, 0.8, 1, 1, 1, 1, 1, and 1.2, respectively. These weights may be received as static values and/or can be dynamically determined based on the content of the graph. Also, the weights may be statically set and then dynamically altered as the process learns better values for the weights based on the training process. In the above, the date metadata may be weighted the least in the representation and the keyword metadata may be weighted the most in the representation.

Also, the weights between each metadata node and its corresponding type node may be set to different values or the same value. In some embodiments, the weight between each metadata node and its corresponding type node may be all set to 0.2. Additionally, the weight of extra links between type nodes in a structure shown in FIG. 3C, such as the people metadata node and the type nodes of actors and directors as well as the extra links between keywords in each type node of the keyword class, may be set to different values or the same value. In some embodiments, the weights may be set to the same value of 0.8.

At 604, tags metadata framework 110 may select start nodes for generating sample paths. The graph may contain a large number of nodes, such as 1,000,000 nodes, and tags metadata framework 110 samples paths in graph 500 to determine the co-occurrences between nodes in the same sample path.

In some embodiments, each node may be taken as a first node in a sample path to generate 20 sample paths. That is, each node may have 20 sample paths generated, although any number of sample paths may be used.

At 606, tags metadata framework 110 selects nodes for each sample path. In some embodiments, the length of the sample paths may be a number, such as 40 nodes for each path. In other examples, another number of nodes may be used or a variable number of nodes for each path may be used. Then, there will be 20 sample paths times the total number of nodes for each path. For each node in a sample path, tags metadata framework 110 selects all the adjacent nodes to that node, normalizes the weights to denote the probability of each adjacent node to be the next node in the sample path. Then, tags metadata framework 110 uses a random function to select the next node based on the probability. From a single point (e.g., a node in the graph), there are m distinct items to be selected, and the probability of each item to be selected is determined by its relative weight. For example, in FIG. 5, the start node is metadata node 304-3 for Adventure (in this case, metadata node 304-3 links to content node 306-1 for Movie #1 and content node 306-2 for Movie #2 with a weight of "1", and links to type node 302-1 for Genre with a weight of "0.2"; however, metadata node 304-3 for Adventure may link to many more nodes in the graph). The probability of the next node to be Movie #1, Movie #2 and the Genre type node will be 1/(1+1+0.2)=0.455, 1/(1+1+0.2)=0.455 and 0.2/(1+1+0.2) =0.09, respectively. One way to perform random sampling is to use a random function to generate a float number between 0-1, and if it is in the interval [0,0.455], tags metadata framework 110 selects Movie #1; if it is in the interval [0.455, 0.91], tags metadata framework 110 selects Movie #2; and if it is in the interval [0.91, 1], tags metadata framework 110 selects the Genre type node. Using the Genre type node, there is a chance that node is selected and once that type node is selected, another genre node will be selected because genre nodes are connected to the Genre type node. This is in contrast to if Movie #1 or Movie #2 is selected. In this case, Movie #1 and Movie #2 are connected to different metadata nodes and there is much less chance that one of the genre metadata nodes will be selected for the sample path. This process is repeated to generate the sample path.

In one example, five sample paths of five nodes may be:
Movie #2→Adventure→Movie #1→2000s→Time Period.
Movie #2→Hobbit→Character→Hobbit→Movie #1.
Movie #2→Director #2→Movie #1→Actor #2→Actor.
Movie #2→TV PG→Ratings→PG-13→Other Entity #1.
Movie #2→Wizard→Movie #1→Magic→Other Entity #2 that includes Magic.

The above five sample paths may start with the node movie #2. Then, tags metadata framework 110 may take another node, such as actor #3 and generate additional sample paths. Some examples of sample paths for Actor #3 include:
Actor #3→Movie #2→British Academy of Films & Television→Sound→Movie #1→PG-13.
Actor #3→Movie #2→Fantasy→Movie #3 with Fantasy elements→other attributes.
Actor #3→Movie #1→Magic→Movie #1→Actor #4.
Actor #3→Movie #1→Survival→Subject→Keywords.
Actor #3→Movie #4 with Actor #3 in it→other→other→other.

Once learning the sample paths, at 608, tags metadata framework 110 performs embedded learning of nodes. The objective of the embedded learning of nodes is to find node representations that are useful to predict the surrounding nodes in the sample path. For example, tags metadata framework 110 may randomly initialize the embedding of each node in graph 500 in a vector, such as a 128-dimensional vector. Given a sample path of nodes $n_1, n_2, \ldots, n_T$, the objective of tags metadata framework 110 is to maximize the average log probability, which may be represented as:

$$\frac{1}{T}\sum_{t=1}^{T}\sum_{-c \leq j \leq c, j \neq 0} \log p(n_{t+j} | n_t),$$

where T is 40 and c is the sliding window size of a training context and is set at 3. The basic probability formulation defines $p(n_{t+j}|n_t)$ using a function, such as a softmax function, which may be represented as:

$$p(o | c) = \frac{\exp(u_o^T v_c)}{\sum_{\omega=1}^{W} \exp(u_\omega^T v_c)},$$

where o and c are the output node and the center node, $u_o$ and $v_c$ represent the embedding vector of them, and W is the total number of nodes in graph. Since there is a dot product function in the objective function, the target can be intuitively explained into the idea that if two nodes always appear together in the same sample paths or appear with the same context of nodes in separate sample paths, tags metadata framework 110 maximizes the dot product value among all possible nodes, so that these two nodes will get a similar embedding representation. And under this idea, if two videos share a lot of common metadata, the videos will get a higher chance to be in the same sample paths, and therefore have a more similar embedding representation than those videos that have irrelevant metadata. Further, there is a higher chance the two videos appear in sample paths that have the same metadata. Accordingly, tags metadata framework 110 may attempt to perform the embedded learning of nodes to maximize an embedding representation if two nodes always appear together in the same sample paths or appear in separate paths with the same context of metadata nodes. When nodes appear in separate paths with the same context of metadata nodes, the two nodes share a lot of metadata nodes in the separate paths. Since the metadata nodes link to a large number of content nodes, tags metadata framework 110 may not always find a sample path such as (content A→shared metadata node→content B), but if tags metadata framework 110 determines a lot of sample paths such as (content A→content D, content B→content D, content A→content E, content B→content E), tags metadata framework 110 can also determine that content A is similar to content B. In this case, content A and content B are in sample paths to include content D and content E, which is a similar context. For example, if two movies share a lot of common metadata, the two movies receive a higher chance to be in the same sample paths or be in sample paths with the same context of nodes and therefore may have a similar content embedding representation than other movies that have metadata that is not the same or different from the two movies' metadata.

At 610, tags metadata framework 110 performs embedding extraction for content instances. For example, tags metadata framework 110 optimizes the objective target of having more similar embedding representations for videos with common metadata in sample paths. The tags metadata embeddings are extracted for content nodes. The tags metadata embeddings may be a vector that represents the content in the vector space. Accordingly, the tags metadata embeddings may be compared to each other in the vector space to determine which vectors are closer and thus the content associated with these vectors may be similar. In the above example, in the sample path Movie #1→Adventure→Movie #2→2000s→Time Period, the sample path is XXX→XXX→Movie #2→XXX→XXX. Tags metadata framework 110 may accurately predict that the surrounding four "XXX" nodes will be Movie #1, Adventure, 2000s, and Time Period. Then, the tags metadata embeddings may be altered such that the embeddings of the context nodes for Movie #2 (e.g., Movie #1, Adventure, 2000s, and Time Period) becomes a little closer to the embedding of the center node which is Movie #2, while the embeddings of other nodes in graph 500 may stay the same. This makes it more likely that Movie #1, Adventure, 2000s, and Time Period may be predicted when Movie #2 as the center node is encountered in a path. Under this objective, if two nodes co-occur in a lot of sample paths together, the nodes may receive a similar embedding. Also, if two nodes show up with the same other nodes in the same context, then these two nodes may have a similar embedding.

Movie #1 and Movie #2 may share a lot of common metadata, such as Actors, Directors, Genres, Keywords, Awards, etc. Thus, Movie #1 and Movie #2 may appear together in many sample paths and can show up in the same context with the same nodes. Accordingly, Movie #1 and Movie #2 may have similar tags metadata embeddings generated compared to other content nodes that do not share the commonality of metadata with each other. Once going through the tags metadata embeddings generation process, at 612, tags metadata framework 110 outputs tags metadata embeddings for each content node.

Embedding Fusion

Embedding fusion engine 112 may combine the text metadata embedding and tags metadata embedding for each content to form a content embedding. Different methods may be used, such as the value for both the text metadata embedding and tags metadata embedding may be combined, added together, or concatenated, or other methods may be used, such as by taking an average of the text metadata embedding and the tags metadata embedding. In other embodiments, the tags metadata embedding may be used as the content embedding or the text metadata embedding may be used as the content embedding.

Recommendation Process

Figure 7:
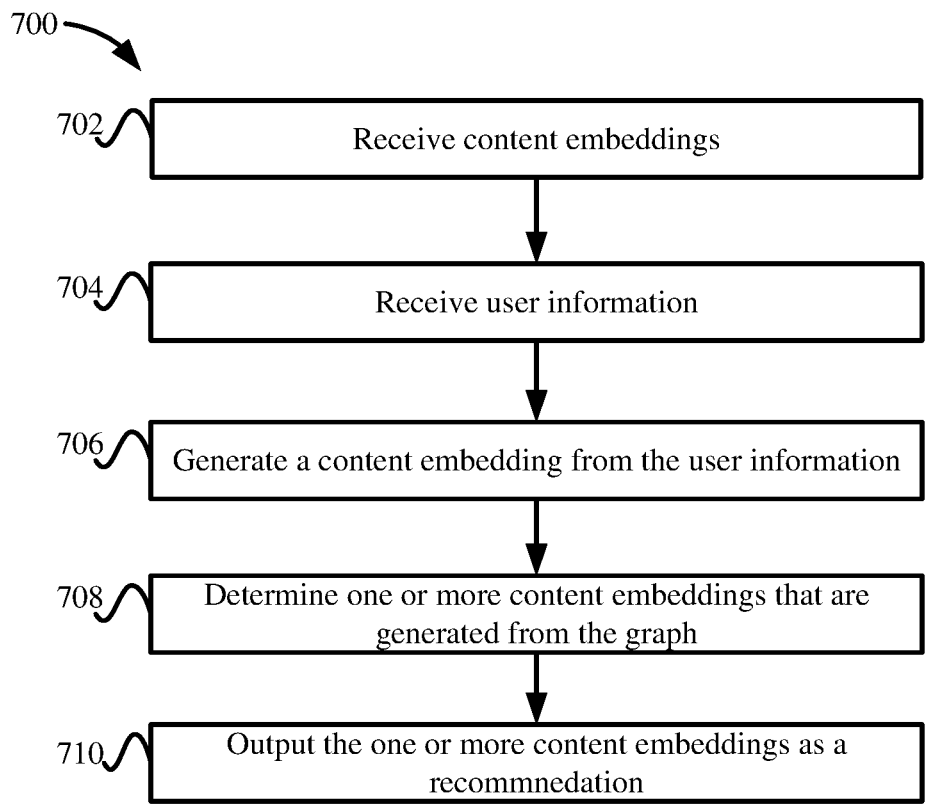
FIG. 7 depicts a simplified flowchart of a method for generating recommendations according to some embodiments.

Once the content embeddings are generated, recommendation engine 114 can generate recommendations. FIG. 7 depicts a simplified flowchart 700 of a method for generating recommendations according to some embodiments. At 702, recommendation engine 114 receives the content embeddings generated from embedding fusion engine 112.

At 704, recommendation engine 114 receives user information. The user information may be user behavior information regarding actions the user has taken in a video delivery system. For example, the actions may be to select videos to watch on the video delivery system.

At 706, recommendation engine 114 generates a content embedding from the user information. In some embodiments, the user information may be converted into a target content, such as a target movie. Recommendation engine 114 then determines the content embedding for that target video. In other methods, recommendation engine 114 determines the content embedding based on multiple videos watched by the user. For example, an average of the content embeddings for the number of videos watched by the user may be generated.

At 708, recommendation engine 114 determines one or more content embeddings that are generated from the graph that are similar to the generated content embedding from the user information. For example, the content embeddings may be similar in the vector space to the generated content embedding from the user information. For example, a threshold may be used to determine the one or more content embeddings that are within a certain value from the generated content embedding from the user information.

At 710, recommendation engine 114 outputs the one or more content embeddings as a recommendation. For example, the recommendations may be output on a user interface that provides related videos to the user.

CONCLUSION

Accordingly, using the content embedding, recommendations at the content level may be generated. This may generate recommendations of content that may be more similar at the content level rather than relying on user watch behavior, which may not provide content that is related at the content level. The content embedding may provide more relevant recommendation results when searching for content that is similar to other content.

Embodiments

In some embodiments, a method includes: mapping, by a computing device, attributes of metadata for a plurality of content instances to metadata nodes, wherein the metadata nodes are connected to type nodes that define a type of metadata for each metadata node and a respective content node for a respective content instance; generating, by the computing device, a plurality of sample paths using the content nodes, the metadata nodes, and the type nodes from the mapping of attributes of the metadata; analyzing, by the computing device, a similarity of content nodes using the plurality of sample paths; and generating, by the computing device, a representation of each of the plurality of content instances using the similarity of the content nodes, wherein the representation represents the similarity between content instances in the plurality of content instances.

In some embodiments, mapping the attributes of the metadata includes: determining a value of an attribute of metadata; selecting a type node based on the value of the attribute; and mapping the value of the attribute to the type node.

In some embodiments, mapping the attributes of the metadata includes: connecting the value of the attribute to the type node and the value of the attribute to a first content node for a first content instance in which the attribute is associated.

In some embodiments, mapping the attributes of the metadata includes: connecting the value of the attribute to the type node and the value of the attribute to a second content node for a second content instance that also is associated with the value.

In some embodiments, generating the plurality of sample paths includes: selecting a start node from one of the content nodes, the metadata nodes, and the type nodes; and selecting one or more nodes from the content nodes, the metadata nodes, and the type nodes that are connected to the start node to form a sample path in the sample path.

In some embodiments, the method includes continuing to generate a number of sample paths using the start node, wherein each sample path includes at least one different node.

In some embodiments, selecting the one or more nodes includes: selecting a first node from the content nodes, the metadata nodes, and the type nodes that is connected to the start node; selecting a second node from the content nodes, the metadata nodes, and the type nodes that is connected to the first node; and continuing to select nodes from the content nodes, the metadata nodes, and the type nodes that are connected to a previously selected node until a limit is reached.

In some embodiments, selecting the one or more nodes includes: using a function to select from a set of nodes that are connected to a node in the sample path.

In some embodiments, selecting the one or more nodes includes: initializing weights on edges that connect nodes that weight an importance of respective connected nodes in similarity, wherein the weights are used to select the one or more nodes in the sample path.

In some embodiments, analyzing the similarity of the content nodes in the plurality of paths includes: selecting a first sample path; analyzing nodes within the first sample path for the similarity of content nodes; and adjusting a similarity value for a first content instance in the first sample path to be similar to a second content instance due to the second content instance appearing in the first sample path.

In some embodiments, analyzing the similarity of the content nodes in the plurality of paths includes: selecting a first sample path and a second sample path; analyzing nodes within the first sample path and the second sample path for similarity of the content nodes; and adjusting a similarity value for a first content instance that has one or more nodes in the first sample path to be similar to a second content instance that has the one or more nodes in the second sample path.

In some embodiments, generating the representation of each of the plurality of content instances includes: generating an embedding in a vector space for each of the plurality of content instances that represents a value of the metadata, wherein content instances with closer embeddings in the vector space are considered more similar.

In some embodiments, the metadata includes a first type of metadata and the representations includes a first representation. The method further includes: receiving a second type of metadata for the plurality of content instances, wherein the second type of metadata includes textual description of a respective content instance; and generating second representations for the plurality of content instances based on an analyzing of the second type of metadata.

In some embodiments, the second representations represent sentence level semantic information from the textual description of the respective content instance.

In some embodiments, the method includes combining the first representations and the second representations for each of the plurality of content instances to generate a combined representation for each of the plurality of content instances.

In some embodiments, a non-transitory computer-readable storage medium contains instructions, that when executed, control a computer system to be operable for: mapping attributes of metadata for a plurality of content instances to metadata nodes, wherein the metadata nodes are connected to type nodes that define a type of metadata for each metadata node and a respective content node for a respective content instance; generating a plurality of sample paths using the content nodes, the metadata nodes, and the type nodes from the mapping of attributes of the metadata; analyzing a similarity of content nodes using the plurality of sample paths; and generating a representation of each of the plurality of content instances using the similarity of the content nodes, wherein the representation represents the similarity between content instances in the plurality of content instances.

In some embodiments, mapping the attributes of the metadata includes: determining a value of an attribute of metadata; selecting a type node based on the value of the attribute; and mapping the value of the attribute to the type node.

In some embodiments, analyzing the similarity of the content nodes in the plurality of paths includes: selecting a first sample path; analyzing nodes within the first sample path for similarity of the content nodes; and adjusting a similarity value for a first content instance in the first sample path to be similar to a second content instance due to the second content instance appearing in the first sample path.

In some embodiments, analyzing the similarity of the content nodes in the plurality of paths includes: selecting a first sample path and a second sample path; analyzing nodes within the first sample path and the second sample path for similarity of the content nodes; and adjusting a similarity value for a first content instance that has one or more nodes in the first sample path to be similar to a second content instance that has the one or more nodes in the second sample path.

In some embodiments, an apparatus includes: one or more computer processors; and a non-transitory computer-readable storage medium comprising instructions, that when executed, control the one or more computer processors to be operable for: mapping attributes of metadata for a plurality of content instances to metadata nodes, wherein the metadata nodes are connected to type nodes that define a type of metadata for each metadata node and a respective content node for a respective content instance; generating a plurality of sample paths using the content nodes, the metadata nodes, and the type nodes from the mapping of attributes of the metadata; analyzing a similarity of content nodes using the plurality of sample paths; and generating a representation of each of the plurality of content instances using the similarity of the content nodes, wherein the representation represents the similarity between content instances in the plurality of content instances.

System

Figure 8:
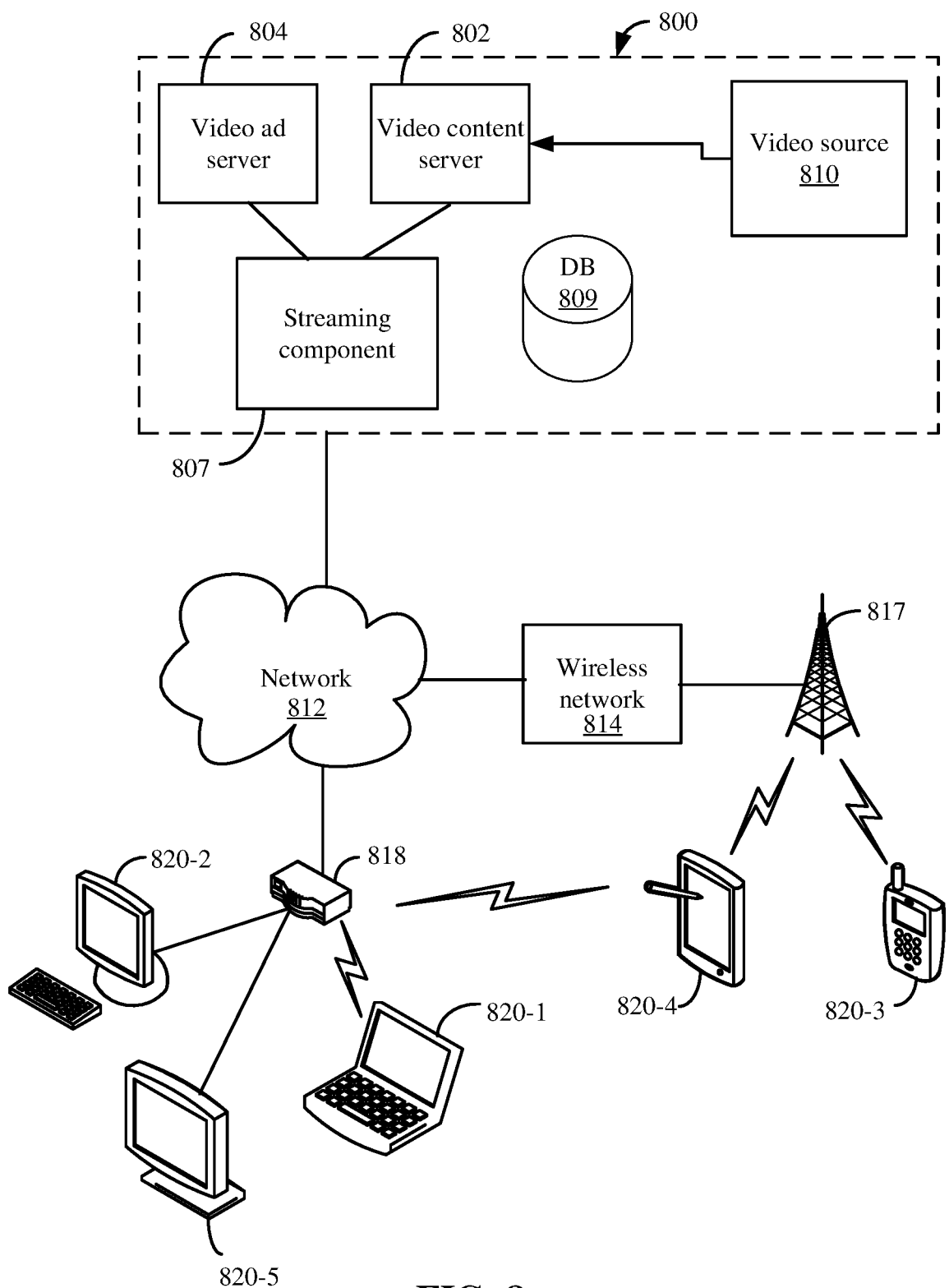
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
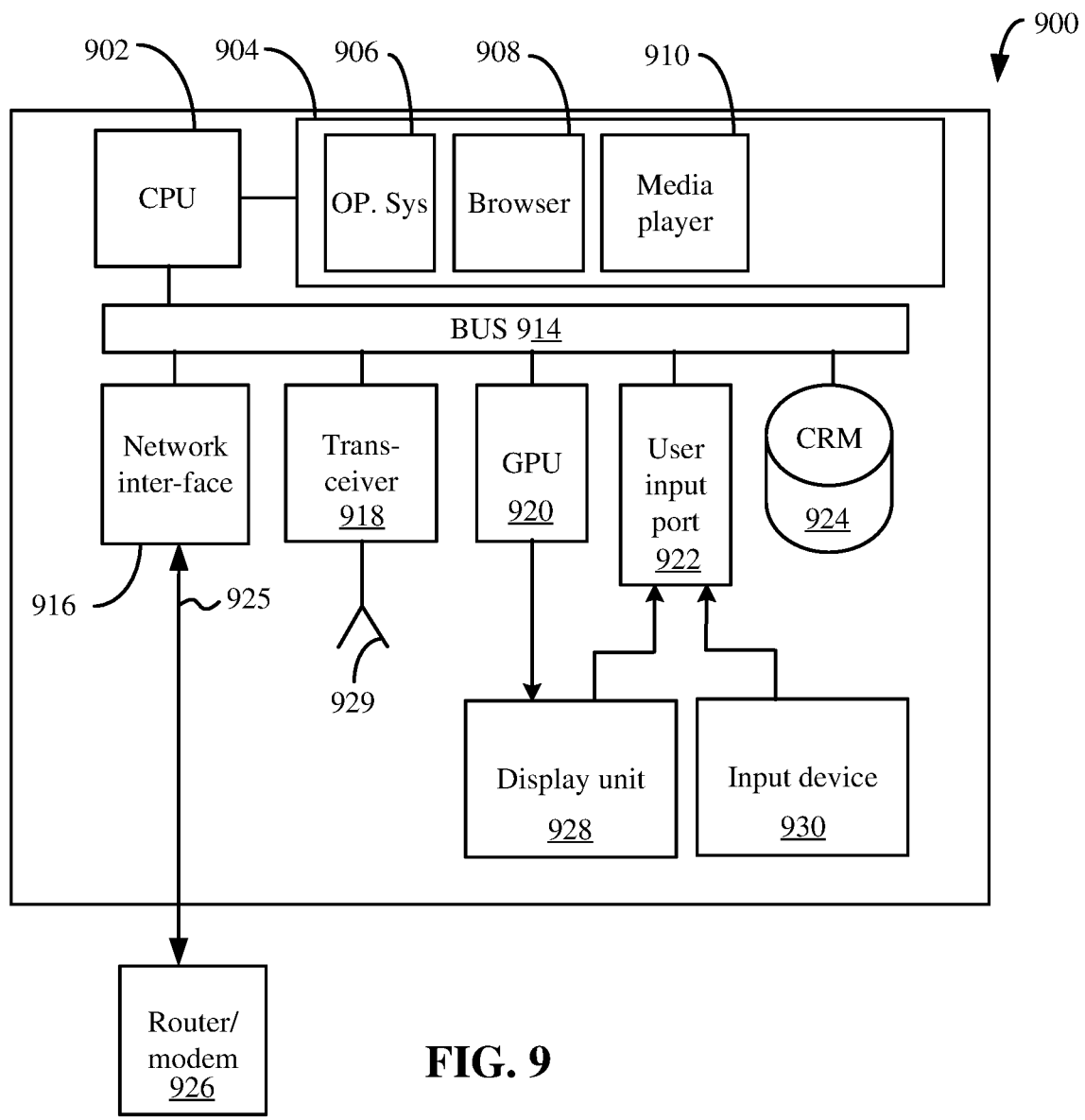
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    mapping, by a computing device, attributes of metadata for a plurality of content instances to metadata nodes via a first set of links, wherein the metadata nodes are connected via a second set of links to type nodes that define a type of metadata for each metadata node and a respective content node for a respective content instance;
    generating, by the computing device, a plurality of sample paths using at least a portion of the first set of links and at least a portion of the second set of links for the content nodes, the metadata nodes, and the type nodes;
    analyzing, by the computing device, a similarity of content nodes using the plurality of sample paths; and
    generating, by the computing device, a representation of each of the plurality of content instances using the similarity of the content nodes, wherein the representation represents the similarity between content instances in the plurality of content instances.

2. The method of claim 1, wherein mapping the attributes of the metadata comprises:
    determining a value of an attribute of metadata;
    selecting a type node based on the value of the attribute; and
    mapping the value of the attribute to the type node.

3. The method of claim 2, wherein mapping the attributes of the metadata comprises:
    connecting the value of the attribute to the type node and the value of the attribute to a first content node for a first content instance in which the attribute is associated.

4. The method of claim 3, wherein mapping the attributes of the metadata comprises:
    connecting the value of the attribute to the type node and the value of the attribute to a second content node for a second content instance that also is associated with the value.

5. The method of claim 1, wherein generating the plurality of sample paths comprises:
    selecting a start node from one of the content nodes, the metadata nodes, and the type nodes; and
    selecting one or more nodes from the content nodes, the metadata nodes, and the type nodes that are connected to the start node to form a sample path in the sample path.

6. The method of claim 5, further comprising:
    continuing to generate a number of sample paths using the start node, wherein each sample path includes at least one different node.

7. The method of claim 5, wherein selecting the one or more nodes comprises:
    selecting a first node from the content nodes, the metadata nodes, and the type nodes that is connected to the start node;
    selecting a second node from the content nodes, the metadata nodes, and the type nodes that is connected to the first node; and
    continuing to select nodes from the content nodes, the metadata nodes, and the type nodes that are connected to a previously selected node until a limit is reached.

8. The method of claim 5, wherein selecting the one or more nodes comprises:
    using a function to select from a set of nodes that are connected to a node in the sample path.

9. The method of claim 1, wherein selecting the one or more nodes comprises:
    initializing weights on links in the first set of links or the second set of links that connect nodes that weight an importance of respective connected nodes in similarity, wherein the weights are used to select the one or more nodes in the sample path.

10. The method of claim 1, wherein analyzing the similarity of the content nodes in the plurality of sample paths comprises:
    selecting a first sample path;
    analyzing nodes within the first sample path for the similarity of content nodes; and
    adjusting a similarity value for a first content instance in the first sample path to be similar to a second content instance due to the second content instance appearing in the first sample path.

11. The method of claim 1, wherein analyzing the similarity of the content nodes in the plurality of sample paths comprises:
    selecting a first sample path and a second sample path;
    analyzing nodes within the first sample path and the second sample path for similarity of the content nodes; and
    adjusting a similarity value for a first content instance that has one or more nodes in the first sample path to be similar to a second content instance that has the one or more nodes in the second sample path.

12. The method of claim 1, wherein generating the representation of each of the plurality of content instances comprises:
    generating an embedding in a vector space for each of the plurality of content instances that represents a value of the metadata, wherein content instances with closer embeddings in the vector space are considered more similar.

13. The method of claim 1, wherein the metadata comprises a first type of metadata and the representation comprise a first representation of each of the plurality of content instances, the method further comprises:

receiving a second type of metadata for the plurality of content instances, wherein the second type of metadata comprises textual description of a respective content instance; and generating a second representation of each of the plurality of content instances based on an analyzing of the second type of metadata.

14. The method of claim 13, wherein the second representation of each of the plurality of content instances represents sentence level semantic information from the textual description of the respective content instance.

15. The method of claim 13, further comprising:
combining the first representations and the second representations for each of the plurality of content instances to generate a combined representation for each of the plurality of content instances.

16. A non-transitory computer-readable storage medium containing instructions, that when executed, control a computer system to be operable for:
mapping attributes of metadata for a plurality of content instances to metadata nodes via a first set of links, wherein the metadata nodes are connected via a second set of links to type nodes that define a type of metadata for each metadata node and a respective content node for a respective content instance;
generating a plurality of sample paths using at least a portion of the first set of links and at least a portion of the second set of links for the content nodes, the metadata nodes, and the type nodes;
analyzing a similarity of content nodes using the plurality of sample paths; and
generating a representation of each of the plurality of content instances using the similarity of the content nodes, wherein the representation represents the similarity between content instances in the plurality of content instances.

17. The non-transitory computer-readable storage medium of claim 16, wherein mapping the attributes of the metadata comprises:
determining a value of an attribute of metadata;
selecting a type node based on the value of the attribute; and
mapping the value of the attribute to the type node.

18. The non-transitory computer-readable storage medium of claim 16, wherein analyzing the similarity of the content nodes in the plurality of sample paths comprises:
selecting a first sample path;
analyzing nodes within the first sample path for similarity of the content nodes; and
adjusting a similarity value for a first content instance in the first sample path to be similar to a second content instance due to the second content instance appearing in the first sample path.

19. The non-transitory computer-readable storage medium of claim 16, wherein analyzing the similarity of the content nodes in the plurality of sample paths comprises:
selecting a first sample path and a second sample path;
analyzing nodes within the first sample path and the second sample path for similarity of the content nodes; and
adjusting a similarity value for a first content instance that has one or more nodes in the first sample path to be similar to a second content instance that has the one or more nodes in the second sample path.

20. An apparatus comprising:
one or more computer processors; and
a non-transitory computer-readable storage medium comprising instructions, that when executed, control the one or more computer processors to be operable for:
mapping attributes of metadata for a plurality of content instances to metadata nodes via a first set of links, wherein the metadata nodes are connected via a second set of links to type nodes that define a type of metadata for each metadata node and a respective content node for a respective content instance;
generating a plurality of sample paths using at least a portion of the first set of links and at least a portion of the second set of links for the content nodes, the metadata nodes, and the type nodes;
analyzing a similarity of content nodes using the plurality of sample paths; and
generating a representation of each of the plurality of content instances using the similarity of the content nodes, wherein the representation represents the similarity between content instances in the plurality of content instances.

* * * * *